US012288641B2

(12) United States Patent
Tsujibayashi et al.

(10) Patent No.: US 12,288,641 B2
(45) Date of Patent: Apr. 29, 2025

(54) CORE AND COIL COMPONENT

(71) Applicant: Murata Manufacturing Co., Ltd., Kyoto-fu (JP)

(72) Inventors: Tarou Tsujibayashi, Nagaokakyo (JP); Masashi Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 758 days.

(21) Appl. No.: 17/501,860

(22) Filed: Oct. 14, 2021

(65) Prior Publication Data

US 2022/0122762 A1 Apr. 21, 2022

(30) Foreign Application Priority Data

Oct. 16, 2020 (JP) ................................ 2020-174856

(51) Int. Cl.

| | |
|---|---|
| ***H01F 17/04*** | (2006.01) |
| ***H01F 27/24*** | (2006.01) |
| ***H01F 27/28*** | (2006.01) |
| ***H01F 27/29*** | (2006.01) |
| ***H01F 27/30*** | (2006.01) |

(52) U.S. Cl.

CPC ........... *H01F 27/292* (2013.01); *H01F 27/24* (2013.01); *H01F 27/2828* (2013.01); *H01F 27/306* (2013.01)

(58) Field of Classification Search

CPC ..................................................... H01F 27/292
USPC ........................................................ 336/221
See application file for complete search history.

(56) References Cited

U.S. PATENT DOCUMENTS

| | | | | |
|---|---|---|---|---|
| 2004/0263285 A1* | 12/2004 | Suzuki | H01F 41/082 | 333/185 |
| 2006/0071749 A1* | 4/2006 | Aoki | H01F 17/045 | 336/83 |
| 2020/0251276 A1* | 8/2020 | Nishimura | H01F 27/292 | |
| 2021/0280356 A1* | 9/2021 | Asai | H01F 27/292 | |

FOREIGN PATENT DOCUMENTS

| | | |
|---|---|---|
| JP | H10-172822 A | 6/1998 |
| JP | 2011-119379 A | 6/2011 |

OTHER PUBLICATIONS

English translation of JP2004146662 (Year: 2004).*

* cited by examiner

*Primary Examiner* — Ronald Hinson
(74) *Attorney, Agent, or Firm* — Studebaker Brackett PLLC

(57) ABSTRACT

A core comprising a winding core part extending in an axial direction; and flange parts respectively disposed at opposite ends of the winding core part in the axial direction. Each of the flange parts has an inner surface facing toward the winding core part, an outer surface facing toward the side opposite to the inner surface, and a lower surface connecting the inner surface and the outer surface. At least one of the flange parts has a groove portion opened in the lower surface and the inner surface. Also, a width of a bottom surface of the groove portion is widened from the inner surface toward the outer surface.

20 Claims, 10 Drawing Sheets

CORE AND COIL COMPONENT

CROSS REFERENCE TO RELATED APPLICATION

This application claims benefit of priority to Japanese Patent Application 2020-174856, filed Oct. 16, 2020, the entire content of which is incorporated herein by reference.

BACKGROUND

Technical Field

The present disclosure relates to a core and a coil component.

Background Art

A conventional coil component is described in Japanese Laid-Open Patent Publication No. 2011-119379. This coil component includes a core including a winding core part and flange parts disposed on both ends of the winding core part, electrode parts disposed on the flange parts of the core, and a wire wound around the winding core part and electrically connected to the electrode parts.

The flange part has an inner surface facing toward the winding core part, an outer surface facing toward the side opposite to the inner surface, and a lower surface connecting the inner surface and the outer surface. The flange part has a groove portion opened in the lower surface and the inner surface. The width of the groove portion becomes narrower from the inner surface toward the outer surface. The electrode part is disposed on the lower surface of the flange part. An end portion of the wire passes through the groove portion and is pressure-bonded to a position near the groove portion on the lower surface of the flange part.

SUMMARY

In the conventional coil component as described above, the end portion of the wire is pressure-bonded to the lower surface of the flange part on the outside of the groove portion, and therefore, when the coil component is mounted on a mounting substrate, a pressure-bonded portion of the end portion of the wire may interfere with the mounting, so that the mounting cannot be stabilized.

Additionally, since the width of the groove portion becomes narrower from the inner surface toward the outer surface, the width of the groove portion is wider on the inner surface side. Therefore, a routing position of the wire wound around the winding core part may vary on the inner surface side of the groove portion, which causes a variation in inductance value generated by a slight difference of a wire path.

Therefore, the present disclosure provides a core and a coil component achieving the stability of mounting and reducing the variation in inductance value.

An aspect of the present disclosure provides a core comprising a winding core part extending in an axial direction; and flange parts respectively disposed at opposite ends of the winding core part in the axial direction. Each of the flange parts has an inner surface facing toward the winding core part, an outer surface facing toward the side opposite to the inner surface, and a lower surface connecting the inner surface and the outer surface. At least one of the flange parts at both ends has a groove portion opened in the lower surface and the inner surface. Also, a width of a bottom surface of the groove portion is widened from the inner surface toward the outer surface.

The lower surface of the flange part of the core refers to a surface on the mounting side when a coil component including the core is mounted on a mounting substrate. The width of the bottom surface of the groove portion refers to a dimension in the direction orthogonal to an axis of the winding core part when viewed in the direction orthogonal to the lower surface of the flange part.

According to the aspect, when the core is used for the coil component, i.e., when the electrode part is disposed on the lower surface of the flange part of the core and in the groove portion of the flange part, and the end portion of the wire is pressure-bonded in the groove portion, a pressure-bonded portion of the end portion of the wire is located in the groove portion, so that when the coil component is mounted on the mounting substrate, the pressure-bonded portion of the end portion of the wire can be made less likely to interfere with the mounting, and the mounting can be stabilized.

Additionally, since the width of the bottom surface of the groove portion is widened from the inner surface toward the outer surface, the width of the bottom surface of the groove portion on the inner surface side is narrow. Therefore, the wire wound around the winding core part is positioned on the inner surface side of the bottom surface of the groove portion, variation of a routing position of the wire can be suppressed, and variation in inductance value can be reduced.

Preferably, an embodiment of a coil component provides a coil component comprising the core; an electrode part disposed on the flange part of the core; and a wire wound around the winding core part of the core and electrically connected to the electrode part. The electrode part is disposed on the lower surface of the flange part and in the groove portion of the flange part. An end portion of the wire includes a pressure-bonded portion pressure-bonded to the electrode part. Also, the pressure-bonded portion is located inside the groove portion.

According to the embodiment, since the pressure-bonded portion of the end portion of the wire is located in the groove portion, when the coil component is mounted on the mounting substrate, the pressure-bonded portion of the end portion of the wire can be made less likely to interfere with the mounting, and the mounting can be stabilized.

Additionally, since the width of the bottom surface of the groove portion is widened from the inner surface toward the outer surface, the width of the bottom surface of the groove portion on the inner surface side is narrow. Therefore, the wire wound around the winding core part is positioned on the inner surface side of the bottom surface of the groove portion, the variation of the routing position of the wire can be suppressed, and the variation in inductance value can be reduced.

Preferably, in an embodiment of the coil component, a maximum depth of the groove portion is smaller than the diameter of the wire.

According to the embodiment, since the maximum depth of the groove portion is smaller than the diameter of the wire, when the end portion of the wire is arranged in the groove portion and thermocompression-bonded by a heater, the end portion of the wire protrudes from the groove portion and can more reliably be brought into contact with the heater. As a result, the end portion of the wire can more reliably be pressure-bonded in the groove portion.

Preferably, in an embodiment of the coil component, the bottom surface of the groove portion is inclined relative to the lower surface such that a depth of the groove portion is shallowed from the inner surface toward the outer surface.

According to the embodiment, since the bottom surface of the groove portion is inclined relative to the lower surface such that the depth of the groove portion is shallowed from the inner surface toward the outer surface, a stress applied to the end portion of the wire can be increased on the outer surface side of the groove portion during thermocompression bonding by the heater, so that the fixing strength between the wire and the electrode part is improved. Additionally, when the wire wound around the core is cut, a large stress can be applied to the end portion of the wire on the outer surface side of the groove portion, so that defective cutting of the wire can be reduced.

Preferably, in an embodiment of the coil component, the bottom surface of the groove portion is connected to the lower surface of the flange part on the outer surface side.

According to the embodiment, since the bottom surface of the groove portion is connected to the lower surface of the flange part on the outer surface side, the bottom surface of the groove portion has a height equal to the lower surface of the flange part on the outer surface side. As a result, a larger stress can be applied to the end portion of the wire.

Preferably, in an embodiment of the coil component, the groove portion is opened in the lower surface, the inner surface, and the outer surface.

According to the embodiment, since the groove portion is opened also in the outer surface, the wire can easily be guided to the entry position to the core when the wire is wound around the core, so that a rate of non-defective wiring is further improved at the time of production of the coil component.

Preferably, in an embodiment of the coil component, the width of the bottom surface of the groove portion on the side closest to the inner surface is 1 time or more and 3 times or less (i.e., from 1 time to 3 times) of the diameter of the wire.

According to the embodiment, since the width of the bottom surface of the groove portion on the side closest to the inner surface is 1 time or more of the diameter of the wire, when the wire wound around the winding core part is put on the inner surface side of the bottom surface of the groove portion, the wire can effortlessly be accommodated in the groove portion, and the wire can easily be positioned. Since the width of the bottom surface of the groove portion on the side closest to the inner surface is 3 times or less of the diameter of the wire, when the wire wound around the winding core part is put on the inner surface side of the bottom surface of the groove portion, the allowance for the wire put on the groove portion can be reduced, and the variation of the routing position of the wire can be suppressed.

Preferably, in an embodiment of the coil component, a width of an opening of the groove portion opened in the lower surface has the same size from the inner surface toward the outer surface.

As used herein, "the same size" means substantially "the same size".

According to the embodiment, the width of the opening of the groove portion opened in the lower surface has the same size from the inner surface toward the outer surface, the width of the opening of the groove portion on the inner surface side can be made larger than the width of the bottom surface of the groove portion on the inner surface side. As a result, the wire wound around the winding core part can easily be guided from the inner surface side of the opening of the groove portion to the inner surface side of the bottom surface of the groove portion.

Preferably, in an embodiment of the coil component, the width of the opening of the groove portion opened in the lower surface is widened from the inner surface toward the outer surface.

According to the embodiment, since the width of the opening of the groove portion opened in the lower surface is widened from the inner surface toward the outer surface, the width of the opening of the groove portion on the inner surface side is narrow. Therefore, the wire wound around the winding core can be positioned not only on the inner surface side of the bottom surface of the groove portion but also on the inner surface side of the opening of the groove portion.

Preferably, in an embodiment of the coil component, an extending direction of the groove portion coincides with a lead-out direction of the end portion of the wire led out from the winding core part when viewed in a direction orthogonal to the lower surface of the flange part.

The extending direction of the groove portion refers to an extending direction of a center line of the width of the bottom surface of the groove portion when viewed in a direction orthogonal to the lower surface of the first flange part.

According to the embodiment, since the extending direction of the groove portion coincides with the lead-out direction of the end portion of the wire led out from the winding core part, the groove portion can be made coincident with the extending direction of the wire, and the stress applied to the wire can be reduced.

Preferably, in an embodiment of the coil component, the groove portion overlaps with an extension line of an axis of the winding core part when viewed in a direction orthogonal to the lower surface of the flange part.

According to the embodiment, since the groove portion overlaps with the extension line of the axis of the winding core part when viewed in a direction orthogonal to the lower surface of the flange part, the pressure-bonded portion of the end portion of the wire can be disposed at the center position in the width direction of the first flange part, and the mounting of the coil component can further be stabilized.

Preferably, in an embodiment of the coil component, the width of the bottom surface of the groove portion on the side closest to the outer surface is 1.5 times or more of the diameter of the wire and equal to or less than the width of the lower surface of the flange part.

According to the embodiment, since the width of the bottom surface of the groove portion on the side closest to the outer surface is 1.5 times or more of the diameter of the wire and equal to or less than the width of the lower surface of the flange part, the width of the bottom surface of the groove portion on the side closest to the outer surface is wide. Therefore, the end portion of the wire can sufficiently be pressure-bonded, and the pressure-bonded portion of the end portion of the wire can further be made less likely to interfere with the mounting. Additionally, a sufficient allowance can be formed at the entry position of the wire to the core when the wire is wound around the core, so that a rate of non-defective wiring is further improved at the time of production of the coil component.

Preferably, in an embodiment of the coil component, the width of the bottom surface of the groove portion on the side closest to the outer surface is 1.5 times or more of the width of the bottom surface of the groove portion on the side closest to the inner surface.

According to the embodiment, since the width of the bottom surface of the groove portion on the side closest to the outer surface is 1.5 times or more of the width of the bottom surface of the groove portion on the side closest to the inner surface, the width of the bottom surface of the groove portion on the side closest to the outer surface is wide. Therefore, the end portion of the wire can sufficiently be pressure-bonded, and the pressure-bonded portion of the end portion of the wire can further be made less likely to interfere with the mounting. Additionally, a sufficient allowance can be formed at the entry position of the wire to the core when the wire is wound around the core, so that a rate of non-defective wiring is further improved at the time of production of the coil component.

The core and the coil component according to an aspect of the present disclosure can stabilize the mounting and reduce the variation in inductance value.

DETAILED DESCRIPTION

A coil component of an aspect of the present disclosure will now be described in detail with reference to shown embodiments. The drawings include schematics and may not reflect actual dimensions or ratios.

First Embodiment

Figure 1:
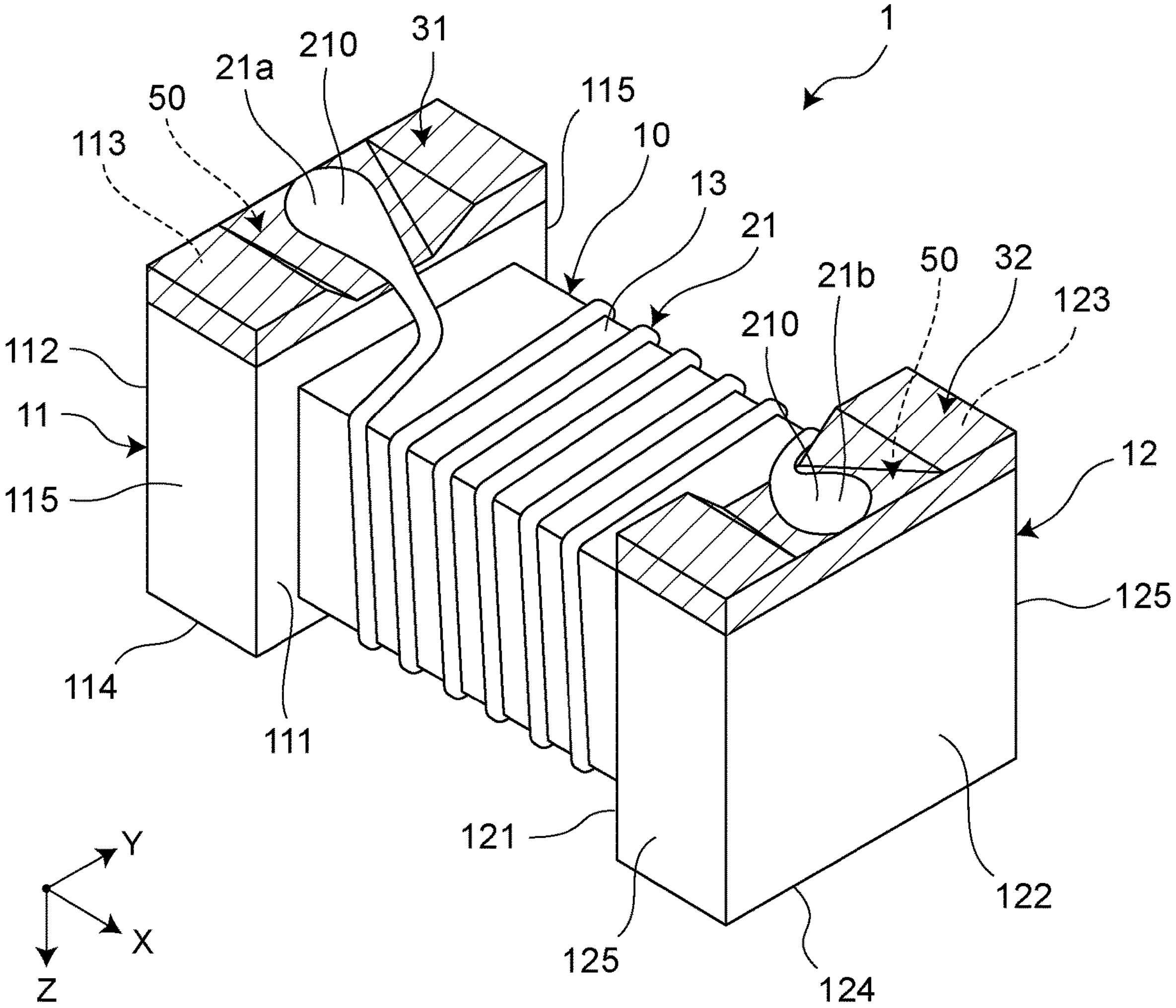
FIG. 1 is a perspective view showing a first embodiment of a coil component as viewed from a lower surface side.

FIG. 1 is a perspective view showing a first embodiment of a coil component as viewed from a lower surface side. As shown in FIG. 1, a coil component 1 includes a core 10, a first electrode part 31 and a second electrode part 32 disposed on the core 10, and a wire 21 wound around the core 10 and connected to the first electrode part 31 and the second electrode part 31.

The core 10 has a winding core part 13 extending in an axial direction, a first flange part 11 disposed at a first end in the axial direction of the winding core part 13 and projecting in a direction orthogonal to the axial direction, and a second flange part 12 disposed at a second end in the axial direction of the winding core part 13 and projecting in a direction orthogonal to the axial direction. A material of the core 10 is preferably a magnetic material such as a sintered body of ferrite and a molded body of a magnetic powder-containing resin, for example, and may be a non-magnetic material such as alumina and resin.

In the following description, a lower surface of the core 10 is a surface to be mounted on a mounting substrate, and a surface opposite to the lower surface of the core 10 is an upper surface of the core 10. An axial direction of the winding core part 13 is defined as an X direction, an opposing direction between the lower surface and the upper surface of the core 10 is defined as a Z direction, and a direction orthogonal to the X direction and the Z direction is defined as a Y direction. The X direction is also referred to as a length direction of the coil component 1, the Y direction is also referred to as a width direction of the coil component 1, and the Z direction is also referred to as a height direction of the coil component 1. It is assumed that a forward direction in the Z direction faces upward.

The first flange part 11 has an inner surface 111 facing toward the winding core part 13, an outer surface 112 facing toward the side opposite to the inner surface 111, a lower surface 113 connecting the inner surface 111 and the outer surface 112, an upper surface 114 facing toward the side opposite to the lower surface 113, and two side surfaces 115 connecting the inner surface 111 and the outer surface 112 and connecting the lower surface 113 and the upper surface 114. Similarly, the second flange part 12 has an inner surface 121 facing toward the winding core part 13, an outer surface 112 facing toward the side opposite to the inner surface 121, a lower surface 123, an upper surface 124, and two side surfaces 125. The lower surface 123, the upper surface 124, and the side surfaces 125 of the second flange part 12 face in the same directions as the lower surface 113, the upper surface 114, and the side surfaces 115, respectively, of the first flange part 11. The lower surfaces and the upper surfaces are defined for convenience of description and may not actually correspond to the lower side and the upper side in the vertical direction.

The first flange part 11 has a groove portion 50 on the lower surface 113, and the first electrode part 31 is disposed on the lower surface 113 and in the groove portion 50. The second flange part 12 has a groove portion 50 on the lower surface 123, and the second electrode part 32 is disposed in the lower surface 123 and the groove portion 50. As shown in FIG. 1, for convenience, the first electrode part 31 and the second electrode part 32 are indicated by hatching.

The wire 21 is wound around the winding core part 13 along the axis of the winding core part 13. The wire 21 is a conductive wire with an insulation coating film that is a conductive wire made of metal such as copper covered with a coating film made of a resin such as polyurethane and polyamide-imide, for example. A first end portion 21*a* of the wire 21 is electrically connected to the first electrode part 31, and a second end portion 21*b* of the wire 21 is electrically connected to the second electrode part 32. The wire 21 and the electrode parts 31, 32 are connected by thermocompression bonding, brazing, or welding, for example.

Figure 2:
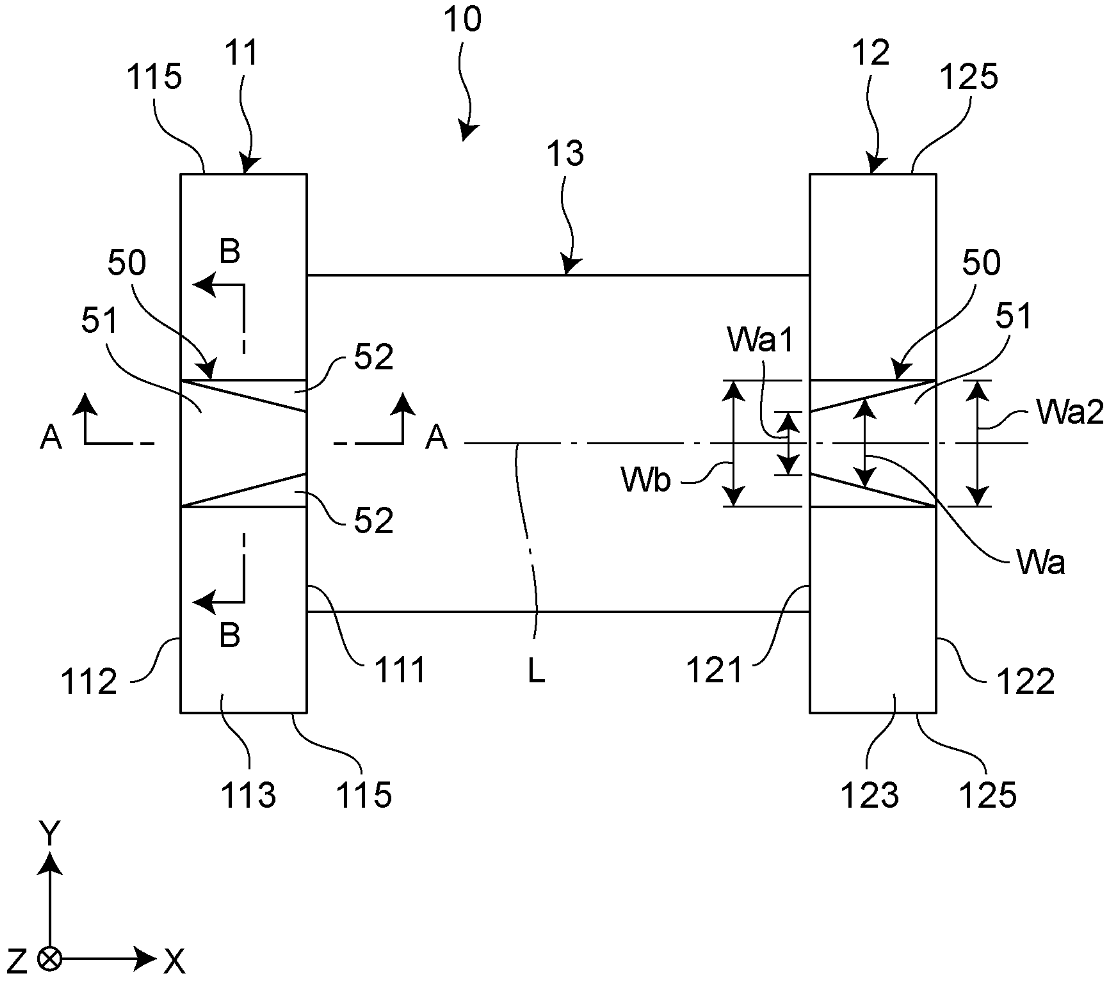
FIG. 2 is a bottom view of a core.
Figure 3A:
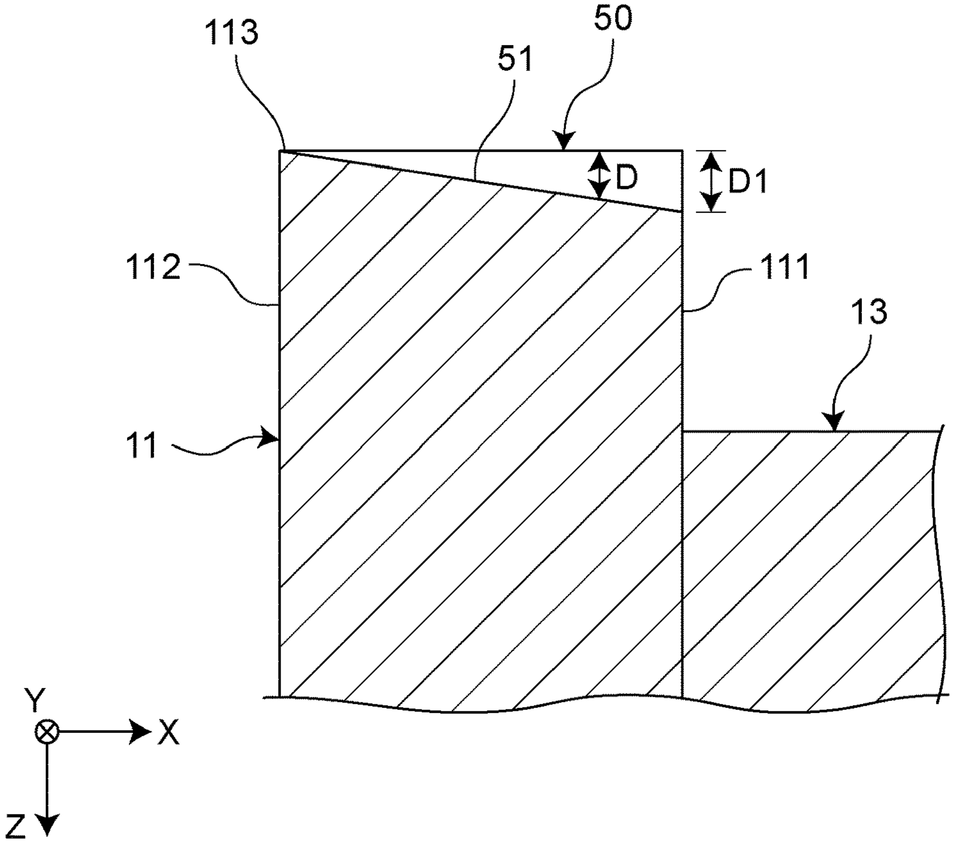
FIG. 3A is a cross-sectional view taken along a line A-A of FIG. 2.
Figure 3B:
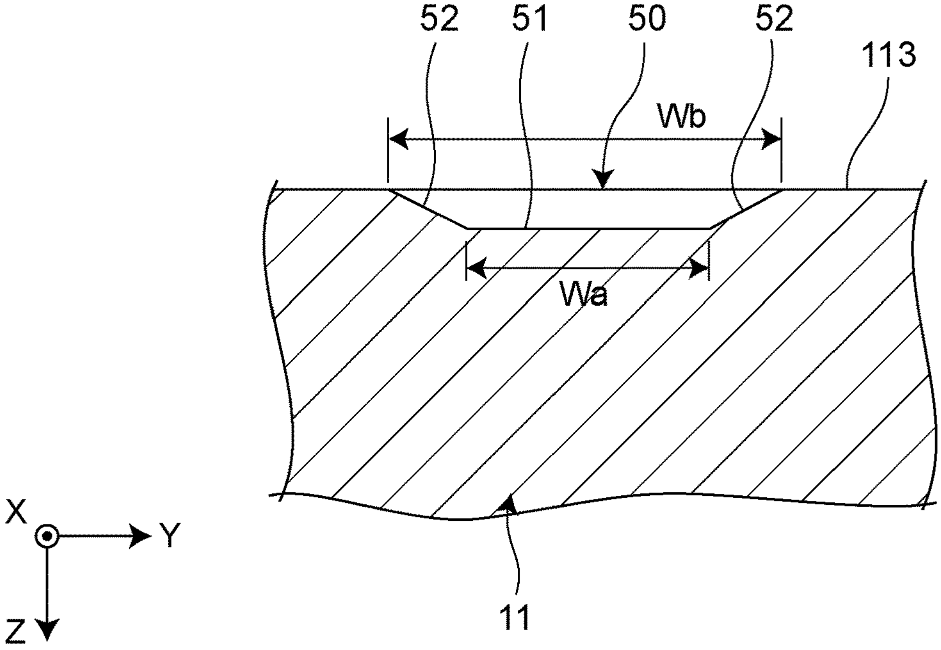
FIG. 3B is a cross-sectional view taken along a line B-B of FIG. 2.

FIG. 2 is a bottom view of the core 10. FIG. 3A is a cross-sectional view taken along a line A-A of FIG. 2. FIG. 3B is a cross-sectional view taken along a line B-B of FIG. 2. As shown in FIGS. 2, 3A, and 3B, the groove portion 50 of the first flange part 11 is opened in the lower surface 113 and the inner surface 111. A width Wa of the bottom surface 51 of the groove portion 50 is continuously widened from the inner surface 111 toward the outer surface 112. The width Wa of the bottom surface 51 refers to a dimension in the direction (Y direction) orthogonal to an axis L of the winding core part 13 when viewed in the direction (Z direction) orthogonal to the lower surface 113. Similarly, the groove portion 50 of the second flange part 12 is opened in the lower surface 123 and the inner surface 121. The width Wa of the bottom surface 51 of the groove portion 50 is continuously widened from the inner surface 121 toward the outer surface 122.

Figure 4:
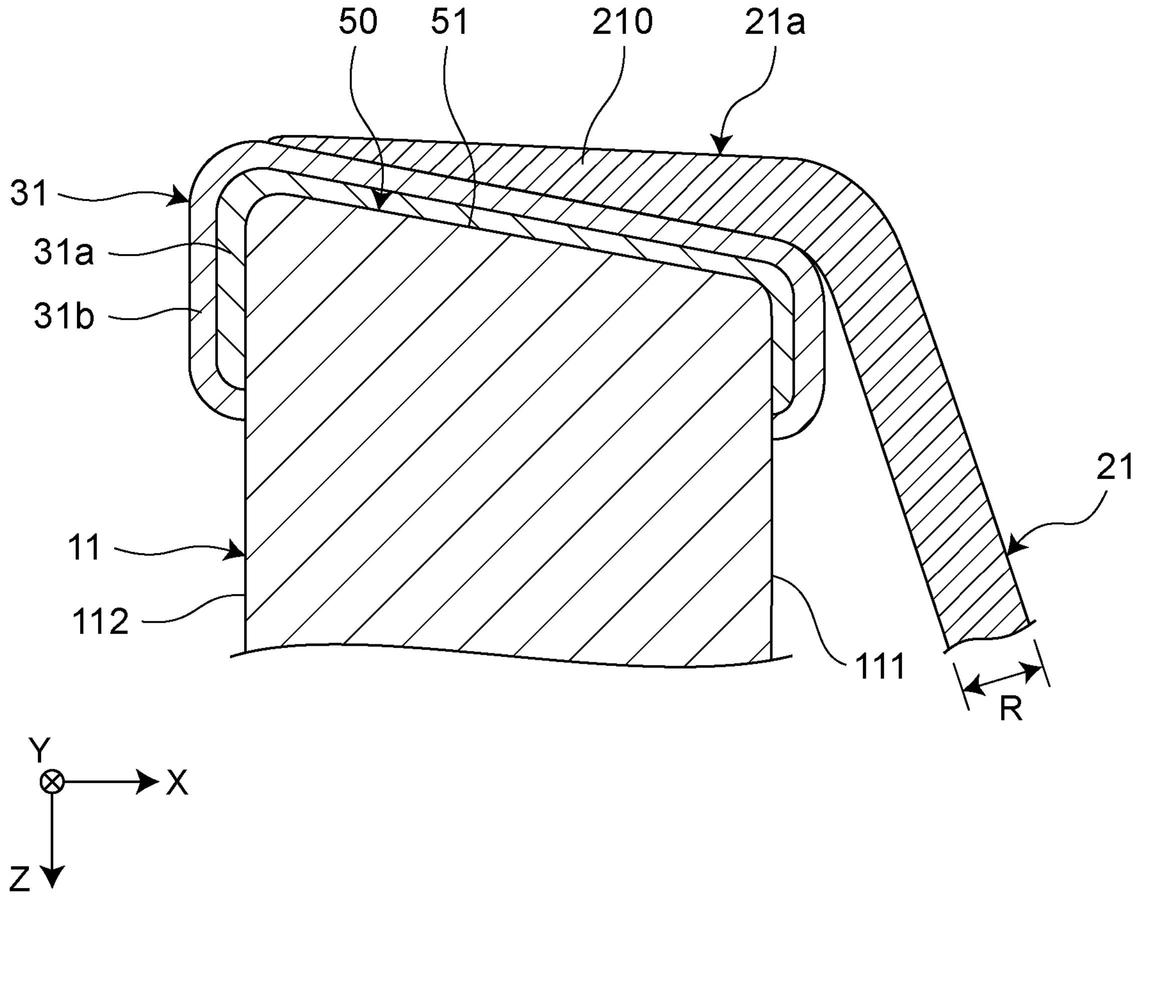
FIG. 4 is an X-Z cross-sectional view at a first end portion of a wire of FIG. 1.

FIG. 4 is an X-Z cross-sectional view at the first end portion of the wire 21 of FIG. 1. As shown in FIGS. 1 and 4, the first end portion 21*a* of the wire 21 includes a pressure-bonded portion 210 pressure-bonded to the first electrode part 31. The pressure-bonded portion 210 is a portion of the first end portion 21*a* of the wire 21 flattened into a flat shape, and is, for example, a portion deformed at the time of thermocompression bonding of the first end portion 21*a* by a heater. The pressure-bonded portion 210 is deformed into a flat shape, for example. The pressure-bonded portion 210 is located in the groove portion 50. The pressure-bonded portion 210 is connected to the first electrode part 31 disposed on the bottom surface 51 of the groove portion 50.

The first electrode part 31 has a base electrode layer 31*a* disposed on the first flange part 11 and a plating layer 31*b* disposed on the base electrode layer 31*a*. The base electrode layer 31*a* is formed by firing a conductive paste such as Ag paste, for example. The plating layer 31*b* contains Ni or Sn, for example. While the pressure-bonded portion 210 is pressure-bonded to the plating layer 31*b*, the plating layer 31*b* may be melted, and the pressure-bonded portion 210 may be embedded in the plating layer 31*b*.

According to the coil component 1, since the pressure-bonded portion 210 of the first end portion 21*a* of the wire 21 is located in the groove portion 50, when the coil component 1 is mounted on the mounting substrate, the first end portion 21*a* of the wire 21 can be made less likely to interfere with the mounting, and the mounting can be stabilized.

Additionally, since the width Wa of the bottom surface 51 of the groove portion 50 is widened from the inner surface 111 toward the outer surface 112, a width Wa1 of the bottom surface 51 of the groove portion 50 on the side closest to the inner surface 111 is narrow. Therefore, the wire 21 wound around the winding core part 13 is positioned on the inner surface 111 side of the bottom surface 51 of the groove portion 50, the variation of the routing position of the wire 21 can be suppressed, and the variation in the inductance value can be reduced.

Additionally, at the time of thermocompression bonding of the first end portion 21*a* of the wire 21, a residue of the coating film of the wire 21 can be prevented from spreading to the first electrode part 31 on the lower surface 113 of the first flange part 11. Since the residue of the coating film of the wire 21 may cause a lack of solder wetting during mounting, this can further stabilize the mounting. Since a width Wa2 of the groove portion 50 on the side closest to the outer surface 112 is wide, an allowance is formed at the entry position of the wire 21 to the core 10 when the wire 21 is wound around the core 10, so that a rate of non-defective wiring is improved at the time of production of the coil component 1.

Additionally, according to the core 10, when the core 10 is used for the coil component 1, i.e., when the electrode parts 31, 32 are disposed on the lower surfaces 113, 123 of the flange parts 11, 12 of the core 10 and in the groove portions 50 of the flange parts 11, 12 and the end portions 21*a*, 21*b* of the wire 21 are pressure-bonded in the groove portions 50, the same effect as the coil component 1 is obtained.

Similarly, the second end portion 21*b* of the wire 21 includes a pressure-bonded portion 210 pressure-bonded to the second electrode part 32. The pressure-bonded portion 210 is located in the groove portion 50. Therefore, the effect at the second end portion 21*b* of the wire 21 has the same effect as the effect at the first end portion 21*a* of the wire 21 described above.

In the following description, the configuration of the second flange part 12 is the same as the configuration of the first flange part 11, and the effect of the second flange part 12 is the same as the effect of the first flange part 11. Therefore, the second flange part 12 will not be described.

As shown in FIG. 3A, the bottom surface 51 of the groove portion 50 is inclined relative to the lower surface 113 such that a depth D of the groove portion 50 is continuously shallowed from the inner surface 111 toward the outer surface 112. A maximum depth D1 of the groove portion 50 is smaller than a diameter R of the wire 21 (see FIG. 4). The depth D of the groove portion 50 is a depth based on the lower surface 113 of the first flange part 11 (D=0). The diameter R of the wire 21 is the diameter of the wire 21 excluding the pressure-bonded portion 210. In FIG. 3A, the maximum depth D1 of the groove portion 50 is the depth D on the inner surface 111 side of the bottom surface 51. The bottom surface 51 of the groove portion 50 may be inclined such that the depth D of the groove portion 50 becomes shallower stepwise from the inner surface 111 toward the outer surface 112.

Figure 5A:
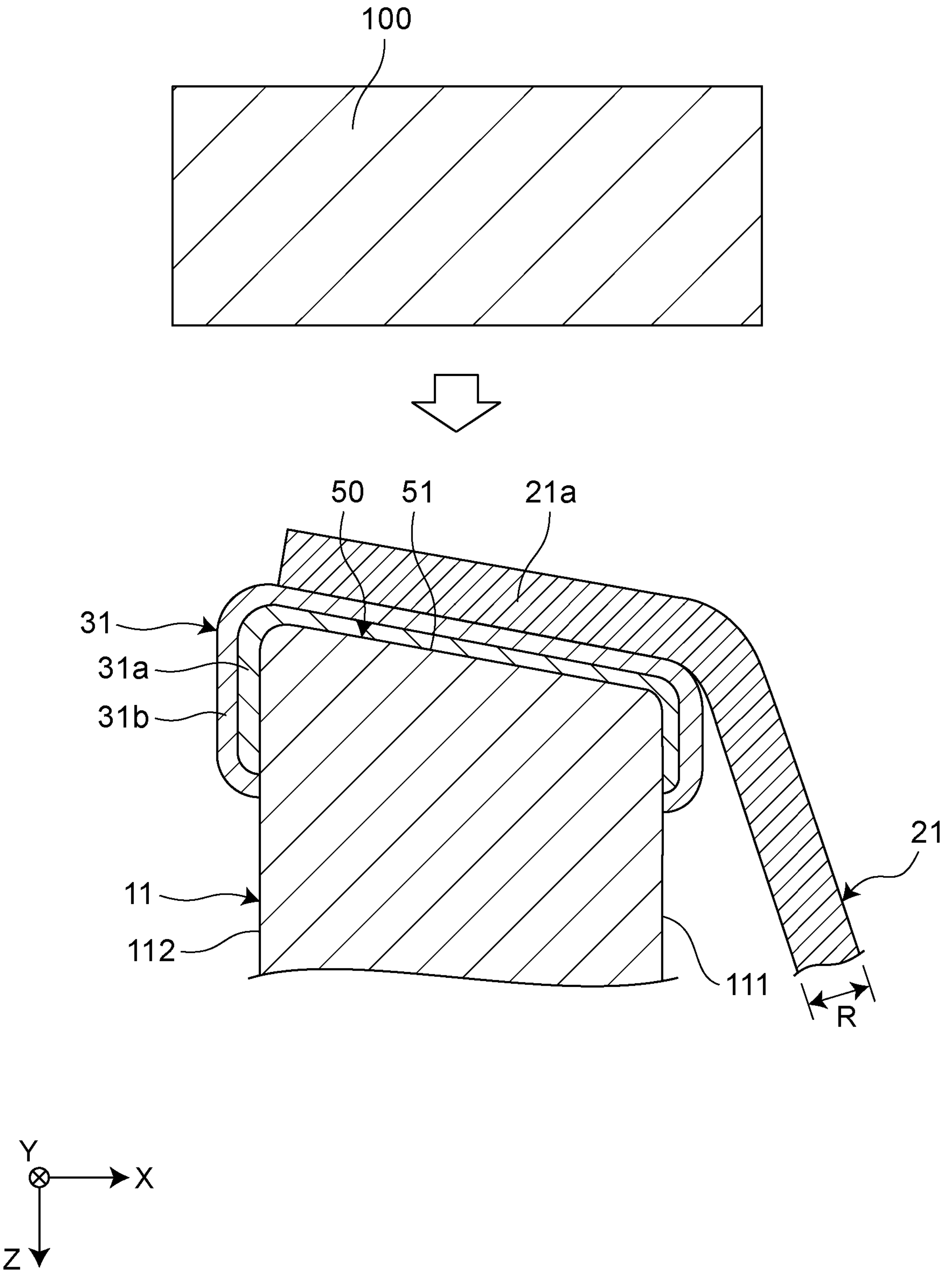
FIG. 5A is a cross-sectional view for explaining a step of performing thermocompression bonding of a wire by a heater.
Figure 5B:
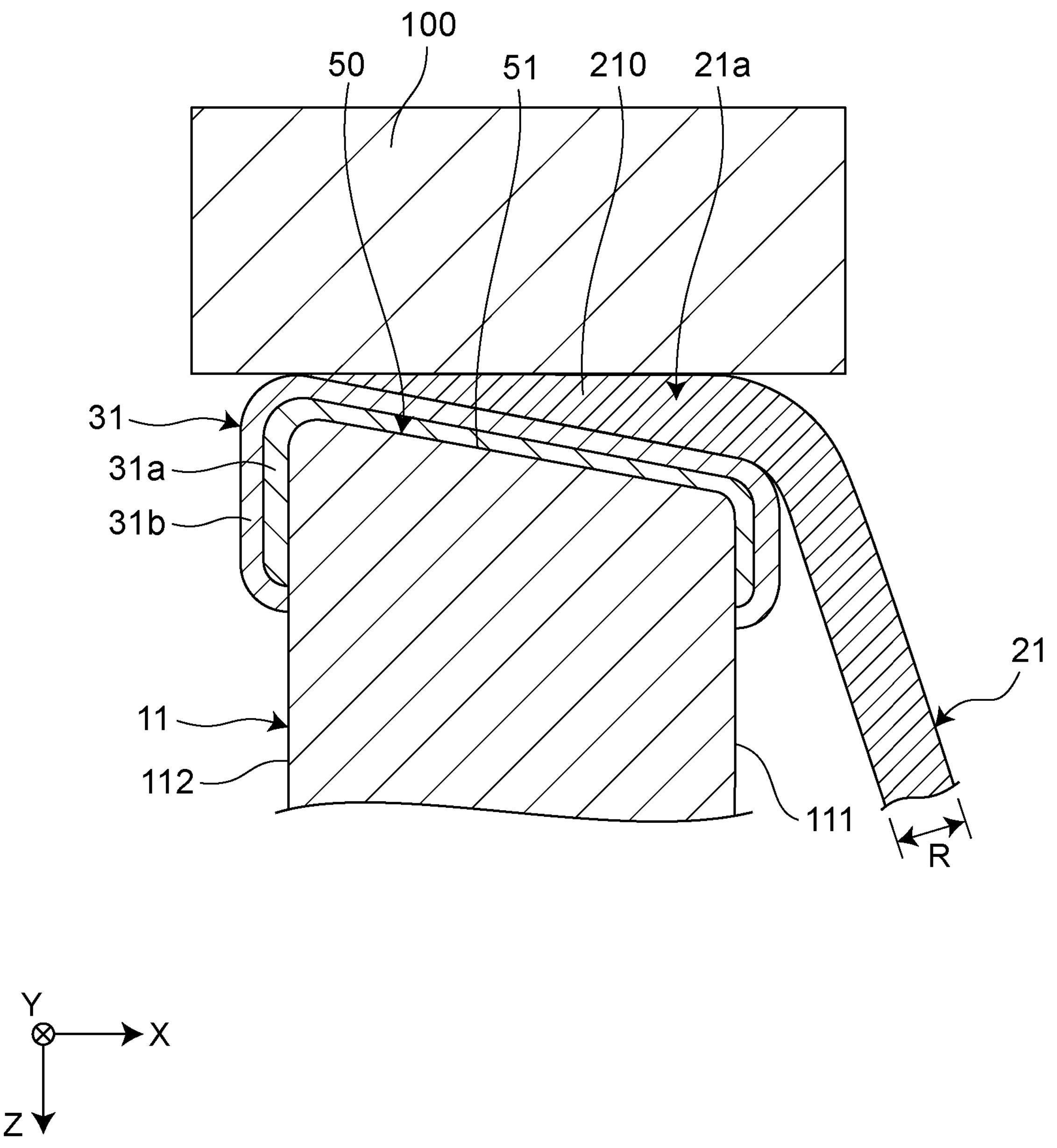
FIG. 5B is a cross-sectional view for explaining the step of performing thermocompression bonding of a wire by a heater.

Therefore, since the maximum depth D1 of the groove portion 50 is smaller than the diameter R of the wire 21, as shown in FIG. 5A, when the first end portion 21*a* of the wire 21 is arranged in the groove portion 50 in the step of performing thermocompression bonding of the wire 21 by the heater 100, the first end portion 21*a* of the wire 21 is in a state of protruding from the groove portion 50. When the first end portion 21*a* of the wire 21 is then pressed by the heater 100, as shown in FIG. 5B, the heater 100 can reliably be brought into contact with a large portion of the first end portion 21*a* of the wire 21 located in the groove portion 50. As a result, the first end portion 21*a* of the wire 21 can more reliably be pressure-bonded in the groove portion 50. Therefore, a large portion of the first end portion 21*a* of the wire 21 in the groove portion 50 can be used as the pressure-bonded portion 210. The surface of the pressure-bonded portion 210 becomes flush with the surface of the first electrode part 31 adjacent to the pressure-bonded portion 210.

Even if the first electrode part 31 is disposed in the groove portion 50, the thickness of the first electrode part 31 is thin, so that the thickness of the first electrode part 31 does not affect the effect derived from the depth D of the groove portion 50. In the following description, the thickness of the first electrode part 31 does not affect the effect derived from the dimensions of the groove portion 50.

Since the bottom surface 51 of the groove portion 50 is inclined such that the depth D of the groove portion 50 becomes shallower from the inner surface 111 toward the outer surface 112, a stress applied to the first end portion 21*a* of the wire 21 can be increased on the outer surface 112 side of the groove portion 50 during thermocompression bonding by the heater 100, so that the fixing strength between the wire 21 and the first electrode part 31 is improved. Additionally, when the wire 21 wound around the core 10 is cut, a large stress can be applied to the first end portion 21*a* of the wire 21 on the outer surface 112 side of the groove portion 50, so that defective cutting of the wire 21 can be reduced.

As shown in FIGS. 2, 3A, and 3B, the bottom surface 51 of the groove portion 50 is connected to the lower surface 113 of the first flange part 11 on the outer surface 112 side. Therefore, the bottom surface 51 of the groove portion 50 has a height equal to the lower surface 113 of the first flange part 11 on the outer surface 112 side. As a result, a larger stress can be applied to the first end portion 21*a* of the wire 21.

Preferably, the width Wa1 of the bottom surface 51 of the groove portion 50 on the side closest to the inner surface 111 is 1 time or more and 3 times or less (i.e., from 1 time to 3 times) of the diameter R of the wire 21. Therefore, since the width Wa1 of the bottom surface 51 of the groove portion 50 on the side closest to the inner surface 111 is at least 1 times of the diameter R of the wire 21, when the wire 21 wound around the winding core part 13 is put on the inner surface 111 side of the bottom surface 51 of the groove portion 50, the wire 21 can effortlessly be accommodated in the groove portion 50, and the wire 21 can easily be positioned. Since the width Wa1 of the bottom surface 51 of the groove portion 50 on the side closest to the inner surface 111 is 3 times or less of the diameter R of the wire 21, when the wire 21 wound around the winding core part 13 is put on the inner surface 111 side of the bottom surface 51 of the groove portion 50, the allowance for the wire 21 put on the groove portion 50 can be reduced, and the variation of the routing position of the wire 21 can be suppressed.

Preferably, a width Wb of an opening of the groove portion 50 opened in the lower surface 113 has the same size from the inner surface 111 toward the outer surface 112. The width Wb of the opening is equal to or larger than the maximum width of the bottom surface 51 (i.e., the width Wa2 of the groove portion 50 on the side closest to the outer surface 112). Therefore, since the width Wb of the opening of the groove portion 50 opened in the lower surface 113 has the same size from the inner surface 111 to the outer surface 112, the width Wb of the opening of the groove portion 50 on the inner surface 111 side can be made larger than the width Wa1 of the bottom surface 51 of the groove portion 50 on the side closest to the inner surface 111. As a result, the wire 21 wound around the winding core part 13 can easily be guided from the inner surface 111 side of the opening of the groove portion 50 to the inner surface 111 side of the bottom surface 51 of the groove portion 50.

Since the width Wb of the opening of the groove portion 50 is the same as or larger than the maximum width of the bottom surface 51, both side surfaces 52 in the width direction of the groove portion 50 are inclined such that a distance between the two side surfaces 52 becomes wider as the depth D of the groove portion 50 becomes shallower. Therefore, when the groove portion 50 is formed by a metal mold, the mold can easily be pulled out from the groove portion 50 since the two side surfaces 52 of the groove portion 50 are inclined, and the groove portion 50 can easily be formed. The groove portion 50 may be formed by dicing, a laser, etc.

Preferably, an extending direction of the groove portion 50 coincides with a lead-out direction of the first end portion 21*a* of the wire 21 led out from the winding core part 13 when viewed in a direction orthogonal to the lower surface 113 of the first flange part 11. The extending direction of the groove portion 50 refers to an extending direction of a center line of the width Wa of the bottom surface 51 of the groove portion 50 when viewed in a direction orthogonal to the lower surface 113 of the first flange part 11. The lead-out direction of the first end portion 21*a* of the wire 21 led out from the winding core part 13 refers to an extending direction of a portion of the wire 21 between the pressure-bonded portion 210 and a portion wound around the winding core part 13. Therefore, since the extending direction of the groove portion 50 coincides with the lead-out direction of the first end portion 21*a* of the wire 21 led out from the winding core part 13, the groove portion 50 can be made coincident with the extending direction of the wire 21, and the stress applied to the wire 21 can be reduced.

Preferably, the groove portion 50 overlaps with an extension line of the axis L of the winding core part 13 when viewed in the direction orthogonal to the lower surface 113 of the first flange part 11. Therefore, the pressure-bonded portion 210 of the first end portion 21*a* of the wire 21 can be disposed at the center position in the width direction of the first flange part 11, and the mounting of the coil component 1 can further be stabilized. More preferably, the extending direction of the groove portion 50 coincides with the axis L of the winding core part 13, and this can further stabilize the mounting of the coil component 1.

Preferably, the width Wa2 of the bottom surface 51 of the groove portion 50 on the side closest to the outer surface 112 is 1.5 times or more of the diameter R of the wire 21 and equal to or less than the width of the lower surface 113 of the first flange part 11. Therefore, since the width Wa2 of the bottom surface 51 of the groove portion 50 on the side closest to the outer surface 112 is wide, the first end portion 21*a* of the wire 21 can sufficiently be pressure-bonded, and the pressure-bonded portion 210 of the first end portion 21*a* of the wire 21 can further be made less likely to interfere with the mounting. Additionally, a sufficient allowance can be formed at the entry position of the wire 21 to the core 10 when the wire 21 is wound around the core 10, so that a rate of non-defective wiring is further improved at the time of production of the coil component 1.

Preferably, the width Wa2 of the bottom surface 51 of the groove portion 50 on the side closest to the outer surface 112 is 1.5 times or more of the width Wa1 of the bottom surface 51 of the groove portion 50 on the side closest to the inner surface 111. Therefore, the width Wa2 of the bottom surface 51 of the groove portion 50 on the side closest to the outer surface 112 is wide. Thus, the first end portion 21*a* of the wire 21 can sufficiently be pressure-bonded, and the pressure-bonded portion 210 of the first end portion 21*a* of the wire 21 can further be made less likely to interfere with the mounting. Additionally, a sufficient allowance can be formed at the entry position of the wire 21 to the core 10 when the wire 21 is wound around the core 10, so that a rate of non-defective wiring is further improved at the time of production of the coil component 1.

Second Embodiment

Figure 6:
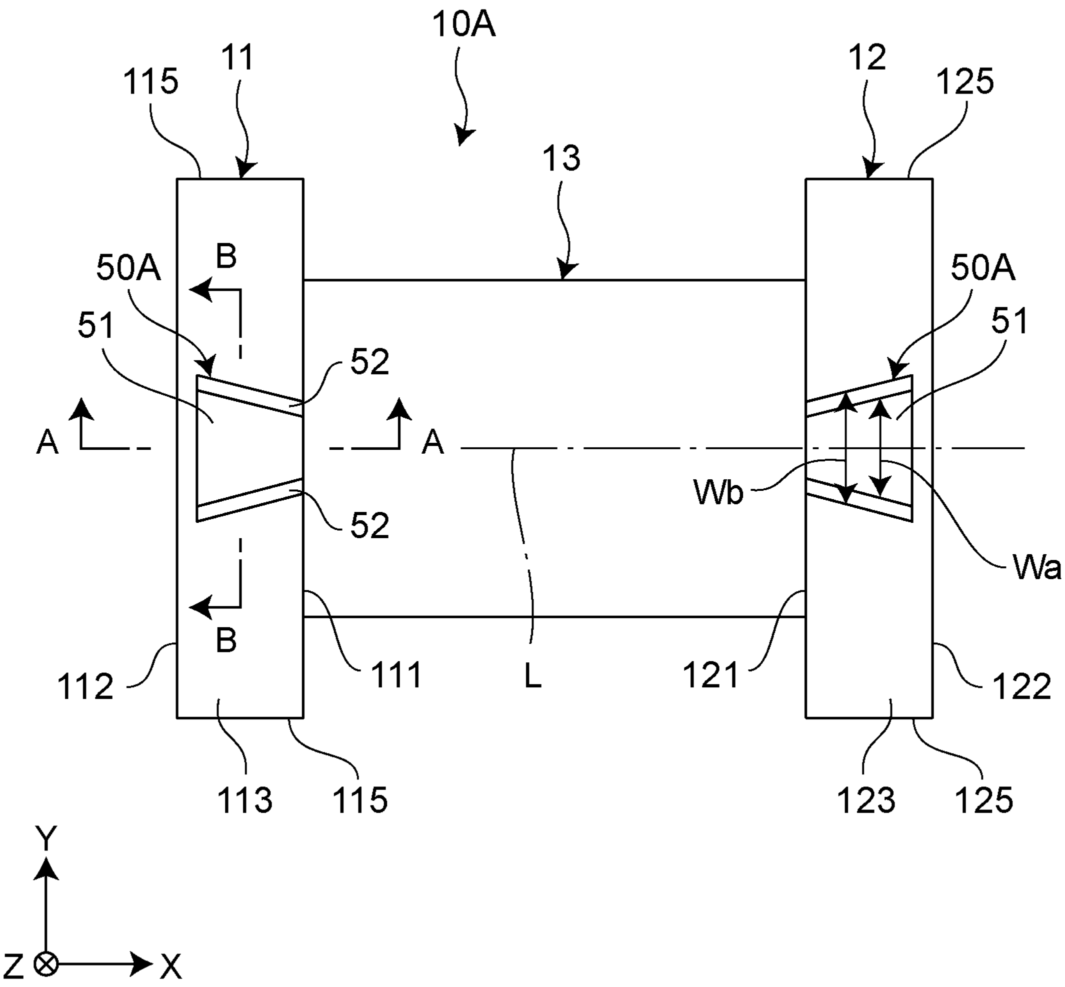
FIG. 6 is a bottom view showing a second embodiment of the core of the coil component.
Figure 7A:
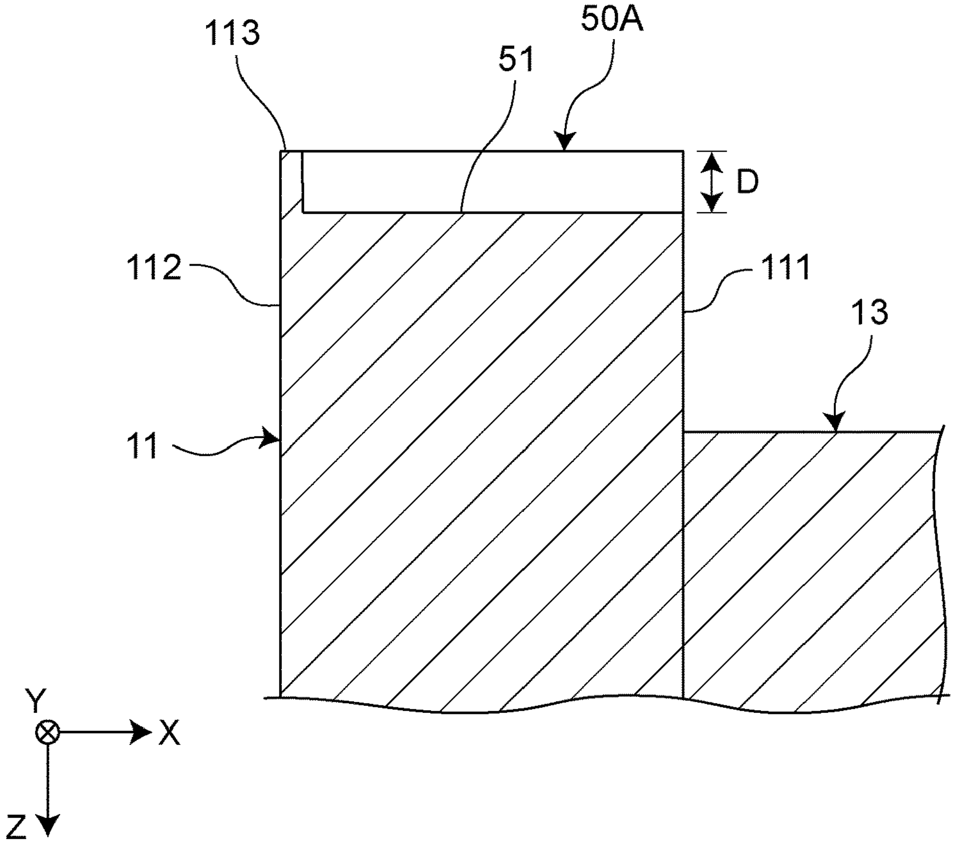
FIG. 7A is a cross-sectional view taken along a line A-A of FIG. 6.
Figure 7B:
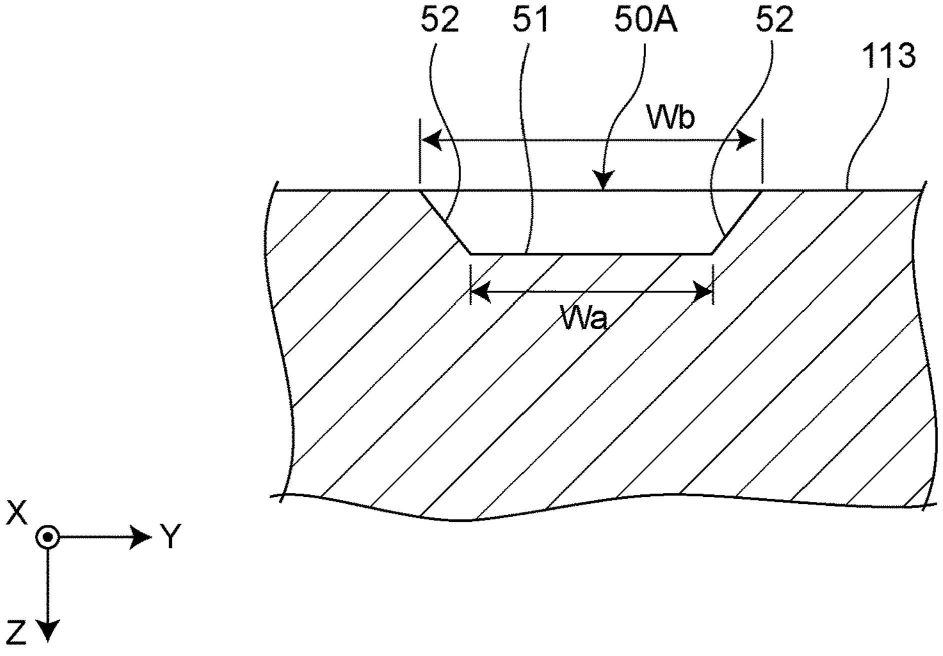
FIG. 7B is a cross-sectional view taken along a line B-B of FIG. 6.

FIG. 6 is a bottom view showing a second embodiment of the core of the coil component. FIG. 7A is a cross-sectional view taken along a line A-A of FIG. 6. FIG. 7B is a cross-sectional view taken along a line B-B of FIG. 6. The second embodiment is different from the first embodiment in the shape of the groove portion of the core. This different configuration will hereinafter be described. The other configurations are the same as those of the first embodiment and will not be described.

As shown in FIGS. 6A, 7A, and 7B, in a core 10A of the coil component of the second embodiment, the width Wb of the opening of a groove portion 50A of the first flange part 11 opened in the lower surface 113 is widened from the inner surface 111 toward the outer surface 112. The opening of the groove portion 50A has a shape formed along the bottom surface 51 of the groove portion 50A. The width Wb of the opening of the groove portion 50A is larger than the width Wa of the bottom surface 51 of the groove portion 50A.

The bottom surface 51 of the groove portion 50A is a flat surface parallel to the lower surface 113. Specifically, the depth D of the groove portion 50A is constant from the inner surface 111 toward the outer surface 112. The groove portion 50A is opened in the lower surface 113 and the inner surface 111 and is not opened in the outer surface 112. Specifically, a partition wall is disposed on the outer surface 112 side of the groove portion 50A.

Therefore, since the width Wb of the opening of the groove portion 50A is widened from the inner surface 111 toward the outer surface 112, the width of the opening of the groove portion 50A on the inner surface 111 side is narrow. Thus, the wire 21 wound around the winding core part 13 can be positioned not only on the inner surface 111 side of the bottom surface 51 of the groove portion 50A but also on the inner surface 111 side of the opening of the groove portion 50A.

The configuration of the second flange part 12 is the same as the configuration of the first flange part 11, and the effect of the second flange part 12 is the same as the effect of the first flange part 11. Therefore, the description of the second flange part 12 will not be made.

Third Embodiment

Figure 8:
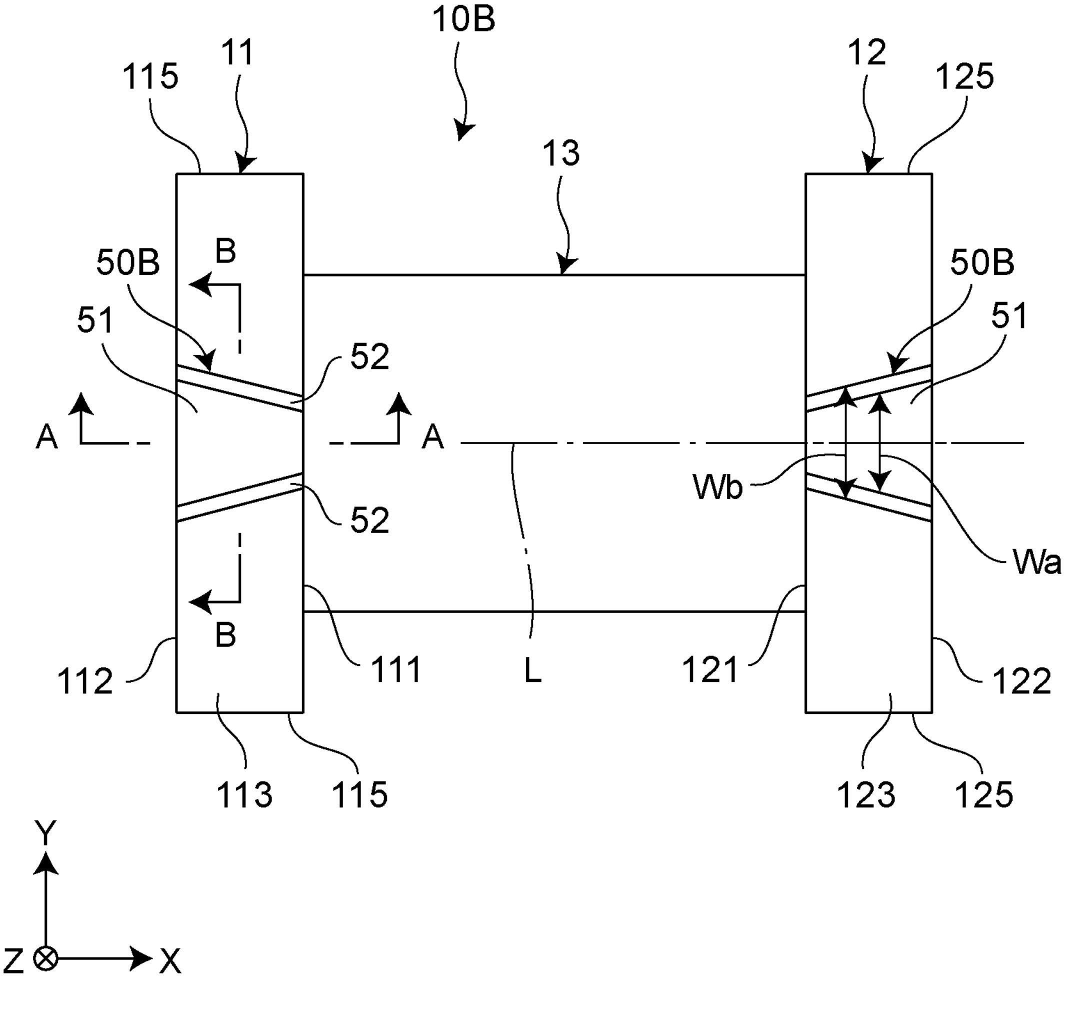
FIG. 8 is a bottom view showing a third embodiment of the core of the coil component.
Figure 9A:
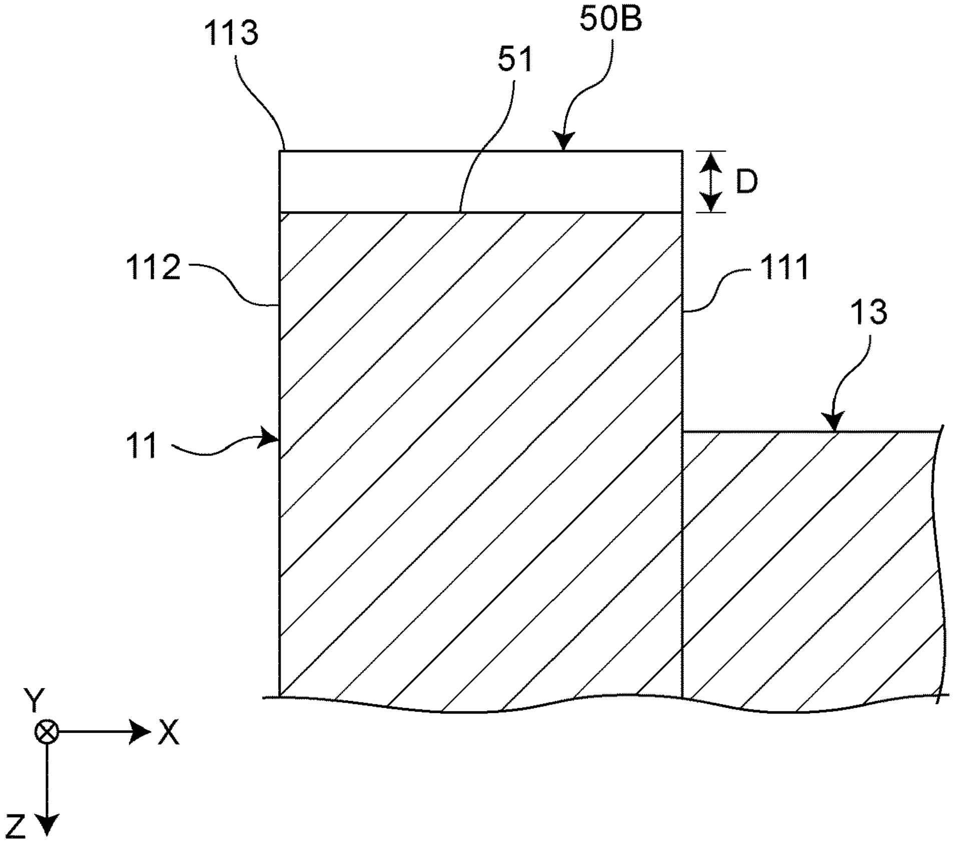
FIG. 9A is a cross-sectional view taken along a line A-A of FIG. 8.
Figure 9B:
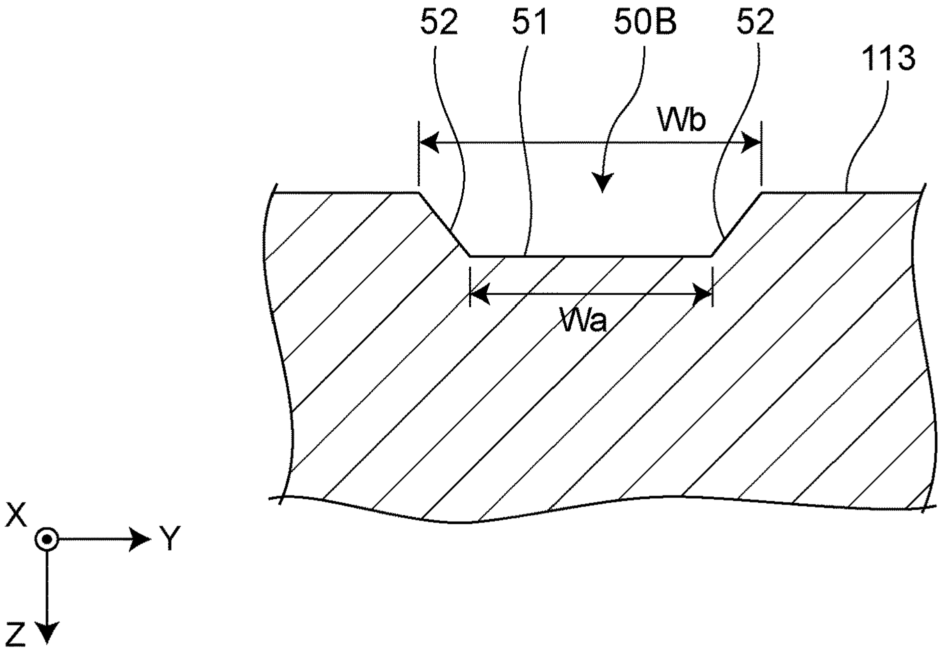
FIG. 9B is a cross-sectional view taken along a line B-B of FIG. 8.

FIG. 8 is a bottom view showing a third embodiment of the core of the coil component. FIG. 9A is a cross-sectional view taken along a line A-A of FIG. 8. FIG. 9B is a cross-sectional view taken along a line B-B of FIG. 8. The third embodiment is different from the second embodiment in the shape of the groove portion of the core. This different configuration will hereinafter be described. The other configurations are the same as those of the second embodiment and will not be described.

As shown in FIGS. 8A, 9A, and 9B, in a core 10B of the coil component of the third embodiment, a groove portion 50B is opened in the lower surface 113, the inner surface 111, and the outer surface 112. Specifically, the groove portion 50B penetrates the first flange part 11 in the direction of the axis L of the winding core part 13. The configuration of the opening on the lower surface 113 side of the groove portion 50B and the configuration of the bottom surface 51 of the groove portion 50B are the same as the groove portion 50A of the second embodiment.

Therefore, since the groove portion 50B is opened also in the outer surface 112, the wire 21 can easily be guided to the entry position to the core 10B when the wire 21 is wound around the core 10B, so that a rate of non-defective wiring is further improved at the time of production of the coil component.

The configuration of the second flange part 12 is the same as the configuration of the first flange part 11, and the effect of the second flange part 12 is the same as the effect of the first flange part 11. Therefore, the description of the second flange part 12 will not be made.

The present disclosure is not limited to the embodiments described above and may be changed in design without departing from the spirit of the present disclosure. For example, respective feature points of the first to third embodiments may variously be combined.

Although the number of the wires is one in the first to third embodiments, multiple wires may be included, and although the number of the groove portions is one in each of the flange portions, multiple flange portions may be included depending on the number of the wires. Although the groove portions are disposed in both the first flange part and the second flange part, the groove portion may be disposed in at least one flange part. Although the groove portions have the same shape in both the first flange part and the second flange part, the groove portions may have the same or different shapes.

Although the width of the bottom surface of the groove portion is continuously widened from the inner surface to the outer surface in the first to third embodiment, the width may be widened stepwise. Although the electrode part is disposed on the entire lower surface of the flange part, the electrode part may be disposed on at least a portion of the lower surface of the flange part.

Although the extending direction of the groove portion coincides with the axial direction of the winding core part in the first to third embodiments, the groove portion may be inclined relative to the axial direction of the winding core part. Although the groove portion overlaps with the extension line of the axis of the winding core part when viewed in the direction orthogonal to the lower surface of the flange part, the groove portion may not overlap with the axis of the winding core part. For example, the groove portion may be deviated toward the side surface of the flange part from the axis of the winding core part.

Although the width of the opening of the groove portion is larger than the width of the bottom surface of the groove portion in the second and third embodiments, the width of the opening of the groove portion may be the same as the width of the bottom surface of the groove portion. In this case, the side surface of the groove portion is orthogonal to the lower surface of the flange part.

What is claimed is:

1. A coil component comprising:

a core comprising:

a winding core part extending in an axial direction; and flange parts, respectively disposed at opposite ends of the winding core part in the axial direction, wherein each of the flange parts has an inner surface facing toward the winding core part, an outer surface facing toward the side opposite to the inner surface, and a lower surface connecting the inner surface and the outer surface, at least one of the flange parts has a groove portion opened in the lower surface and the inner surface, a width of a bottom surface of the groove portion is widened from the inner surface toward the outer surface, and the bottom surface of the groove portion is inclined relative to the lower surface such that a depth of the groove portion is shallowed from the inner surface toward the outer surface;

an electrode part disposed on one of the flange parts of the core; and a wire wound around the winding core part of the core and electrically connected to the electrode part, wherein the electrode part is disposed on the lower surface of the one of the flange parts and in the groove portion of the one of the flange parts, an end portion of the wire includes a pressure-bonded portion pressure-bonded to the electrode part, and the pressure-bonded portion is located on the inclined bottom surface of the groove portion.

2. The coil component according to claim 1, wherein the bottom surface of the groove portion is connected to the lower surface of the one of the flange parts on the outer surface side.

3. The coil component according to claim 1, wherein the groove portion is opened in the lower surface, the inner surface, and the outer surface.

4. The coil component according to claim 1, wherein the width of the bottom surface of the groove portion on the side closest to the inner surface is from 1 time to 3 times the diameter of the wire.

5. The coil component according to claim 1, wherein a width of an opening of the groove portion opened in the lower surface has the same size from the inner surface toward the outer surface.

6. The coil component according to claim 1, wherein the width of the opening of the groove portion opened in the lower surface is widened from the inner surface toward the outer surface.

7. The coil component according to claim 1, wherein an extending direction of the groove portion coincides with a lead-out direction of the end portion of the wire led out from the winding core part when viewed in a direction orthogonal to the lower surface of the one of the flange parts.

8. The coil component according to claim 1, wherein the groove portion overlaps with an extension line of an axis of the winding core part when viewed in a direction orthogonal to the lower surface of the one of the flange parts.

9. The coil component according to claim 1, wherein the width of the bottom surface of the groove portion on the side closest to the outer surface is 1.5 times or more of the diameter of the wire and equal to or less than the width of the lower surface of the one of the flange parts.

10. The coil component according to claim 1, wherein the width of the bottom surface of the groove portion on the side closest to the outer surface is 1.5 times or more of the width of the bottom surface of the groove portion on the side closest to the inner surface.

11. The coil component according to claim 1, wherein the sides of the bottom surface of the groove portion are angled along an entire length of the bottom surface of the groove portion with respect to a center line of the winding core part, and the bottom surface of the groove portion is directly connected to the outer surface.

12. The coil component according to claim 1, wherein the width of the bottom surface of the groove portion is widened continuously from the inner surface to a direct connection with the outer surface.

13. The coil component according to claim 1, wherein the electrode part extends along the inner surface toward the winding core part.

14. The coil component according to claim 1, wherein a maximum depth of the groove portion is smaller than the diameter of the wire.

15. The coil component according to claim 14, wherein the groove portion is opened in the lower surface, the inner surface, and the outer surface.

16. The coil component according to claim 14, wherein the width of the bottom surface of the groove portion on the side closest to the inner surface is from 1 time to 3 times the diameter of the wire.

17. The coil component according to claim 14, wherein a width of an opening of the groove portion opened in the lower surface has the same size from the inner surface toward the outer surface.

18. The coil component according to claim 14, wherein the width of the opening of the groove portion opened in the lower surface is widened from the inner surface toward the outer surface.

19. The coil component according to claim 14, wherein an extending direction of the groove portion coincides with a lead-out direction of the end portion of the wire led out from the winding core part when viewed in a direction orthogonal to the lower surface of the one of the flange parts.

20. The coil component according to claim 14, wherein the groove portion overlaps with an extension line of an axis of the winding core part when viewed in a direction orthogonal to the lower surface of the one of the flange parts.

* * * * *